Dec. 22, 1942.  J. W. WILKINSON  2,305,654
FILTER CASING
Filed July 20, 1939
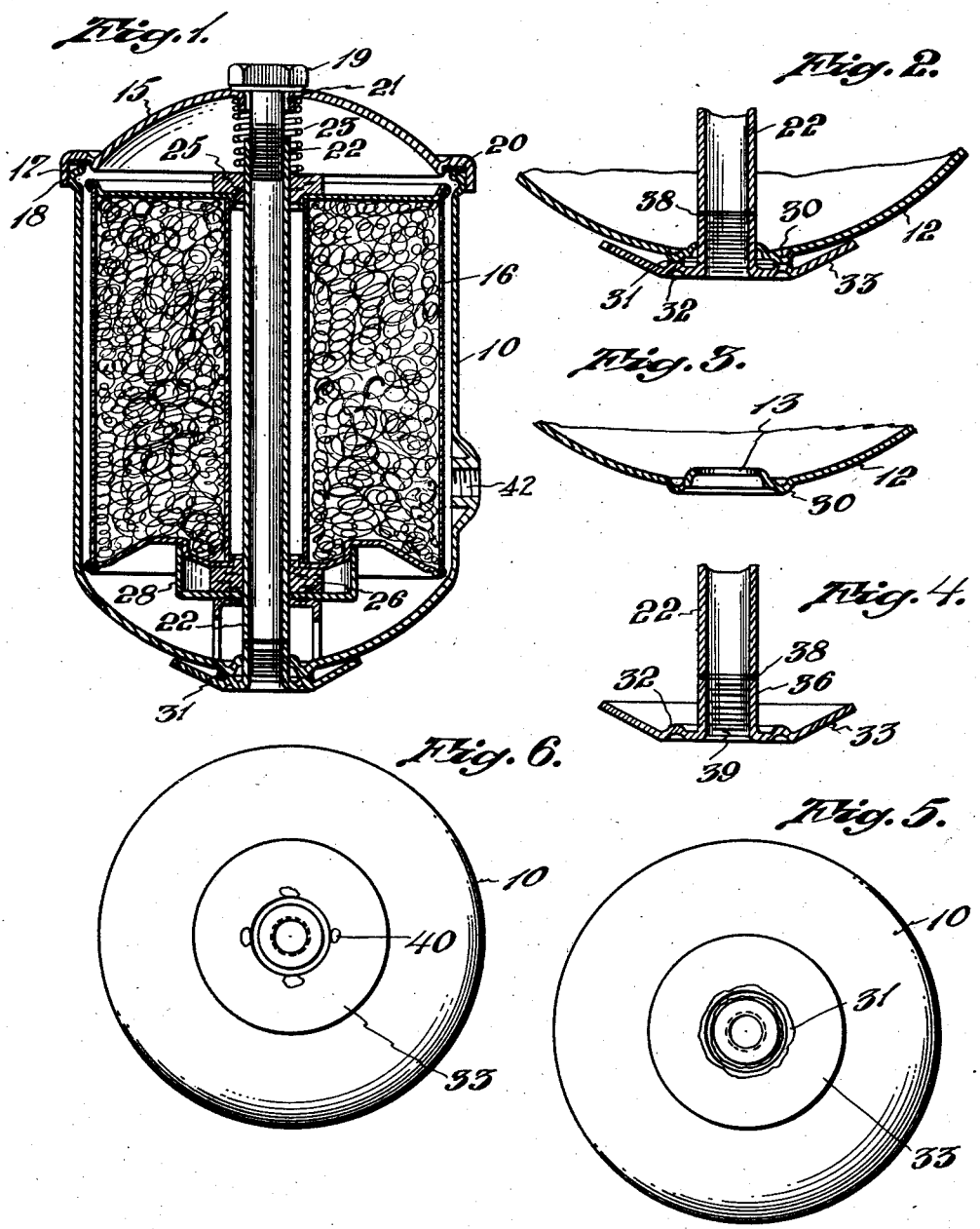
INVENTOR.
James W. Wilkinson
BY Barlow & Barlow
ATTORNEYS.

Patented Dec. 22, 1942

2,305,654

UNITED STATES PATENT OFFICE 2,305,654

FILTER CASING

James W. Wilkinson, Providence, R. I., assignor to Fram Corporation, a corporation of Rhode Island Application July 20, 1939, Serial No. 285,475

4 Claims. (Cl. 210—62)

This invention relates to oil filters, and is particularly concerned with improvements in the casing member of oil filters of the type adapted to be disposed in the pressure lubrication systems of internal combustion engines for filtering the lubricating oil; and has for one of its objects the prevention of leakage at the joint between the casing and the center lubricant conducting tube.

Another object of the invention is to provide a filter casing having a bottom wall of light construction which will be so reinforced and stiffened by the connection thereto of the central lubricant conducting tube as to be strengthened against being collapsed upon tightening of the filter parts into their proper assembled position.

Another object of the invention is to provide a center lubricant conducting tube which is incapable of turning around within the casing when the removable cover is being tightened into a closed possition on the casing.

Another object of the invention is to provide means integral with both the casing and the central perforated lubricant tube in which the arrangement is such that the tube is stiffened and held properly centered in position in the casing and in addition a fluid tight seal is formed between such parts.

Another object of the invention is to provide a filter embodying a casing having the center tubular fluid conducting member and one end wall of the casing welded together so that the tubular member is permanently attached to the casing and is integral therewith.

With these and other objects in view, the invention consists of certain novel features of construction, as will be more fully described, and particularly pointed out in the appended claims.

In the accompanying drawing:

Fig. 1 is a central longitudinal sectional view showing one form of casing construction in accordance with the invention illustrating the filter cartridge unit in assembled position for proper operation in the casing;

Fig. 2 is a fragmentary central sectional view, on enlarged scale, of the discharge end of the filter casing illustrated in Fig. 1 showing the construction of the joints integrally uniting the tubular conduit connector fitting to both the casing and the central perforated tube;

Fig. 3 is a detail fragmentary central sectional view of the bottom wall of the filter casing shown in Fig. 2 showing the downwardly projecting annular rib to which the outside annular flange of the conduit connector fitting is welded;

Fig. 4 is a detail fragmentary sectional view showing the central fluid conducting tube butt welded to the upper end of the tubular member of the conduit connector fitting within the casing;

Fig. 5 is a bottom view of the filter casing illustrating the manner in which the annular flange of the conduit connector fitting is spot welded to the exterior of the bottom wall of the filter casing; and Fig. 6 is a modified form of welded joint which may be employed for integrally joining the annular conduit flange to the bottom wall of the casing.

In one common form of filter construction heretofore employed the usual central perforated tube which is located within the casing has been secured in proper operating position therein by means of nuts disposed on opposite sides of the bottom wall of the casing and threadingly arranged on the lower end of the tubular member which extends through a central opening in the bottom wall of the casing. In such prior construction suitable gaskets are interposed between the nuts and the adjacent surface of the casing bottom so that tightening of the nuts on the tube serves to rigidly hold the tubular member securely in place while the gaskets provide an oil tight joint around the central opening in the bottom wall. A sleeve is then placed over the central perforated tubular member within the casing and rests upon the top surface of the inside nut to provide a spacer for supporting the usual removable filter cartridge above the rounded bottom wall of the casing when the cartridge is placed within the same. Suitable gaskets are provided at the end openings of the heads of the filter cartridge unit which is held seated upon the lower gasket by downward movement of the cover in being tightly drawn down over the open upper end of the casing by turning of the central clamping bolt passing through the cover and having a threaded engagement within the upper end of the central tubular discharge member.

This previous form of oil filter construction, however, has not proved entirely satisfactory since the turning movement of the bolt in clamping down the cover has sometimes resulted in causing a twisting strain to be exerted on the central tube to turn the same and cause it to become loose and produce a leaky joint around the opening where the lower end of the tube is secured by the nuts to the bottom wall of the casing. In another instance, a big wrench exerted on the cover securing bolt has been found to cause collapsing of the light bottom wall of the casing due to the inward movement of the central tubular discharge member in being drawn upwardly as the bolt is being turned down and set up tight, and in order to obviate these aforementioned difficulties I provide a single unitary structure of the center tube and the casing, in which I weld a conduit connector fitting to the center tube and also join the fitting by welding material to the exterior surface of the bottom wall of the casing, which construction forms a fluid tight seal between the parts and by reason of annular ribs on the bottom wall of the casing and the fitting and jointed together by such welding material I provide a stiff support for the center tube and also reinforce the bottom wall against collapse; and the following is a more detailed description of the present embodiment of this invention, illustrating the preferred means by which these advantageous results may be accomplished:

With reference to the drawing, 10 designates a metal casing which consists of a generally cylindrical member or shell having an outwardly bulging end wall 12 which forms the bottom of the casing and is of generally rounded contour and provided with a central opening 13. The other end of the casing 10 is open and is capped by a removable cover 15 to permit insertion or withdrawal of the annular filtering cartridge 16 from the interior of the casing. The cover 15 is of generally arched formation and has an annular rim 17 which engages and slides over the rounded periphery of an outwardly projecting annular rib or bead 18 formed in the side wall of the casing in close proximity to its open end when the cover is drawn down on the casing by means of the bolt 19 to press the annular gasket 20, carried by the cover into fluid-tight sealing engagement with the top end face of the casing and to secure the cover to the casing. The bolt 19 extends inwardly of the casing through a central opening 21 in the cover and has screw threaded engagement within the upper end of the central tubular lubricant conducting member 22 of the filter so that the turning of the bolt 19 in order to draw down the cover 15 into sealing relation with the open end of the casing will also serve to compress a coiled spring 23 interposed between the inner face of the cover and an annular cork gasket 25 sealing the upper end opening of the filter cartridge 16 and the center tube 22 to apply pressure to the gasket 25 and force the cartridge 16 into oil-tight sealing relation with an annular cork gasket 26 closing the bottom end opening of the central core of the filter cartridge 16. In order to center the filter cartridge 16 in proper operating position in the casing I may employ suitable centering devices, such as for example as upwardly open cup member 28 of the form shown, described and claimed in the copending application of Thomas E. Aldham, for Filter cartridge mounting, filed July 20, 1939, Serial No. 285,473.

To provide a fluid-tight joint for the lower end of the center tubular lubricant conducting member 22 in order to connect the same with the bottom wall of the casing, I have provided a novel conduit connector construction which consists of an annular downwardly extending rib or corrugation 30 struck out from the bottom wall 12 of the casing to which rib is integrally united, as by means of the ring of welding material 31, the upwardly extending annular rib 32 on the annular flange 33 of the conduit connector fitting generally designated 35. The fitting 35 is shown as being drawn upwardly at its center so as to provide a central upwardly projecting tubular or sleeve-like member 36 which projects inwardly within the filter casing through the central opening 13 in the bottom wall 12. The inner end face of the tubular member 36 is butt welded, as indicated at 38, to the bottom end face of the center tube 22 so that the latter, by reason of the ring of welding material 31 which secures the fitting 35 to the bottom wall 12 of the casing, becomes an integral part of the casing and thus is held properly centered at all times with respect thereto and also is stiffened by reason of the outside annular flange 33 of the conduit connector fitting.

As shown in Figs. 1, 2, and 4, the annular flange 33 is of a generally upwardly open dished-shape formation with upwardly extending inclined sides, which sides are bent upwardly after the application of the welding material 31, to bring their top edges close to the bottom wall of the casing and present the effect of continuity of its surface. The external end opening of the tubular member 36 is suitably threaded internally, as indicated at 39, and forms the outlet for connection of the filter to a suitable lubricant conducting conduit.

The welded joint 31 uniting the ribs 30 and 32 together may be located either around the outside of the ribs with the ribs in butt to butt engagement, as shown in Fig. 1, or the welding material 31 may be placed between the opposed ends of the ribs as shown in Fig. 2. If desired, a series of spot welds 40 may be employed, as shown in Fig. 6, for joining the ribs together instead of a continuous layer or ring of the welding material. In any case, the weld 31 or the spot welds 40 function as the sole means for securing the conduit connector fitting 35 to the bottom wall 12 of the casing, and also for attaching the center tube 22 to the same.

While I have indicated above that the welded joint uniting the tubular member to the bottom wall of the casing is exterior of the casing member, it is also to be understood that the welds attaching the tubular member to said bottom wall of the casing may be disposed inside the casing, the tubular member being welded to the inside surface portion of the casing bottom wall.

As shown in Figs. 1 and 2, the annular ribs 30 and 32 are located close to the central opening 13 of the bottom wall of the casing and the tubular member 36 respectively and reinforce the light bottom wall 12 and the flange 33. The ribs 30 and 32 project toward each other and are in substantial alignment one with the other when united together by the welding material 31 or 40 respectively.

The casing 10 also is provided with an internally threaded inlet opening 42 in a portion of the side wall of the casing intermediate of its ends for connection of a suitable fitting (not shown) to allow the oil to be filtered to enter the casing 10 and pass radially inwardly through the perforations in the outer side walls of the cartridge 16, thence through the filtering material contained therein, and escape through the perforations of the walls of the inner core of the filter cartridge and pass out of the casing through the center tube 22 and the outlet opening 39.

I claim:

1. A casing unit for a filter comprising a shell open at its upper end, having an outwardly bulging bottom wall and a central opening therein, a perforated center tube within the shell and extending longitudinally thereof, the upper end of said center tube being provided with screw-threads to receive a threaded cover securing member, and means to support and fixedly retain said tube centrally of said casing and adapted to be connected to a lubricant conduit, said means consisting of an annular flange exterior of said casing and extending over the outer surface of said bottom wall of the shell adjacent to the central opening and a tubular member integral with said flange and rising upwardly therefrom and projecting inwardly into the casing through the central opening in said bottom wall, the top end of said tubular member within the shell being integrally joined with a butt welded joint to the lower end of the central perforated tube, said bottom wall of the casing and said annular flange each having an annular stiffening rib about the central opening which ribs project toward each other in the assembled relationship of such parts and are welded to each other to permanently connect the center tube to the casing.

2. A casing unit for a filter comprising a shell open at its upper end, having a bottom wall and a central opening therein, a perforated center tube within the shell and extending longitudinally thereof, the upper end of said center tube being provided with screw threads to receive a threaded cover securing member, and means to support and fixedly retain said tube centrally of said casing and adapted to be connected to a lubricant conduit, said means consisting of an annular flange exterior of said casing and extending over the outer surface of said bottom wall of the shell adjacent to the central opening to form a collar about the same, and a tubular member integral with said flange and rising upwardly therefrom and projecting inwardly into the casing through the central opening in said bottom wall, the top end of said tubular member within the shell being integrally joined with a butt welded joint to the lower end of the central perforated tube, said flange being of a generally dished-shaped formation with upwardly inclined sides, the inside surface of said flange having an annular rib encircling the tubular member and in contact with and welded to an outwardly projecting annular rib in the bottom wall of the shell about the central opening thereof, said flange and the bottom wall of the casing being permanently connected together solely by the welded joint securing the annular ribs together.

3. A casing unit for a filter comprising a shell open at its upper end, having a bottom wall provided with a central opening therein, a perforated center tube within the shell and extending longitudinally thereof, the upper end of said center tube being provided with screw threads to receive a threaded cover-securing member, and means to support and fixedly retain said tube centrally of said casing and adapted to be connected to a lubricant conduit, said means consisting of a fitting having an annular flange exterior of the casing and extending over a considerable portion of the outer surface of said bottom wall of the shell adjacent to the central opening, and a tubular member integral with said flange and rising upwardly therefrom and projecting inwardly into the casing through the central opening in said bottom wall, the top end of said tubular member within the shell being integrally united to the lower end of the central perforated tube, said bottom wall of the casing and said annular flange each having an annular stiffening rib about the central opening which ribs project toward each other in the assembled relationship of such parts and which are secured to each other by welding to permanently connect said fitting and the center tube to the casing.

4. A casing unit for a filter comprising a shell open at its upper end, having a bottom wall provided with a central opening therein, a perforated center tube within the shell and extending longitudinally thereof, the upper end of said center tube being provided with screw threads to receive a threaded cover-securing member, and means to support and fixedly retain said tube centrally of said casing and adapted to be connected to a lubricant conduit, said means consisting of a fitting having an annular flange exterior of the casing and extending over a considerable portion of the outer surface of said bottom wall of the shell adjacent to the central opening, and a tubular member integral with said flange and rising upwardly therefrom and projecting inwardly into the casing through the central opening in said bottom wall, the top end of said tubular member within the shell being integrally united together with a butt welded joint to the lower end of the central perforated tube, said bottom wall of the casing and said annular flange each having an annular stiffening rib about the central opening which ribs project toward each other in the assembled relationship of such parts and are welded to each other throughout the extent of the ribs to permanently connect said fitting and the center tube to the casing.

JAMES W. WILKINSON.